(12) United States Patent
Lockwood et al.

(10) Patent No.: US 11,668,533 B2
(45) Date of Patent: Jun. 6, 2023

(54) METHOD FOR MANUFACTURING A CURVED HEAT EXCHANGER USING WEDGE SHAPED SEGMENTS

(71) Applicant: Hamilton Sundstrand Corporation, Charlotte, NC (US)

(72) Inventors: William T. Lockwood, Windsor Locks, CT (US); Matthew William Miller, Enfield, CT (US); Luke J. Mayo, Coventry, CT (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 55 days.

(21) Appl. No.: 17/345,307

(22) Filed: Jun. 11, 2021

(65) Prior Publication Data

US 2021/0381779 A1  Dec. 9, 2021

Related U.S. Application Data

(60) Continuation of application No. 16/712,731, filed on Dec. 12, 2019, now Pat. No. 11,060,802, which is a
(Continued)

(51) Int. Cl.
*F28F 3/02* (2006.01)
*F28D 9/00* (2006.01)
(Continued)

(52) U.S. Cl.
CPC ............ *F28F 3/025* (2013.01); *B23K 1/0012* (2013.01); *F28D 1/0246* (2013.01);
(Continued)

(58) Field of Classification Search
None
See application file for complete search history.

(56) References Cited

U.S. PATENT DOCUMENTS 5,513,695 A * 5/1996 Harting ................. F28D 19/044
165/8
5,564,496 A 10/1996 Blum et al.
(Continued)

FOREIGN PATENT DOCUMENTS

| DE | 102010046471 A1 | 3/2012 |
|---|---|---|
| EP | 3364142 A1 | 8/2018 |
| EP | 3460377 A1 | 3/2019 |
| WO | 2017090595 A1 | 6/2017 |

OTHER PUBLICATIONS

Extended European Search Report dated May 22, 2019, received for corresponding European Application No. 18204860.3.

*Primary Examiner* — Jacob J Cigna
(74) *Attorney, Agent, or Firm* — Kinney & Lange, P.A.

(57) ABSTRACT

A method for manufacturing a heat exchanger includes stacking a plurality of parting sheets, a plurality of lengthwise closure bars, and a plurality of widthwise closure bars to form a rectangular first heat exchanger section. The first heat exchanger section includes at least one widthwise passage extending between a pair of the widthwise closure bars and at least one lengthwise passage extending between a pair of the lengthwise closure bars. The method also includes brazing the rectangular first heat exchanger section together and cutting a first side and a second side of the rectangular first heat exchanger section to give the first heat exchanger section a tapered-trapezoid profile. The method further includes brazing an end of a second heat exchanger section to the first or second side of the first heat exchanger section.

6 Claims, 6 Drawing Sheets

Related U.S. Application Data division of application No. 15/864,760, filed on Jan. 8, 2018, now Pat. No. 10,551,131.

(51) Int. Cl.
    *B23K 1/00*     (2006.01)
    *F28D 1/02*     (2006.01)
    *F28F 9/26*     (2006.01)
    *F28D 7/00*     (2006.01)
    *F28D 1/053*     (2006.01)
    *F28D 21/00*     (2006.01)

(52) U.S. Cl.
    CPC ......... *F28D 1/05366* (2013.01); *F28D 7/005* (2013.01); *F28D 9/0025* (2013.01); *F28D 9/0062* (2013.01); *F28F 9/26* (2013.01); *F28D 2021/0021* (2013.01); *F28F 2210/10* (2013.01); *F28F 2240/00* (2013.01)

(56) References Cited

U.S. PATENT DOCUMENTS

| | | | |
|---|---|---|---|
| 6,263,955 B1 | 7/2001 | Azar | |
| 6,931,848 B2* | 8/2005 | Maceda | F02G 1/043 60/524 |
| 9,593,647 B2* | 3/2017 | Demots | F28F 1/12 |
| 10,551,131 B2* | 2/2020 | Lockwood | F28D 1/0246 |
| 11,002,491 B2* | 5/2021 | Pollard | F28D 9/0093 |
| 11,060,802 B2* | 7/2021 | Lockwood | F28D 7/005 |
| 2006/0124281 A1* | 6/2006 | Rosenfeld | F28D 15/046 165/104.33 |
| 2015/0260459 A1* | 9/2015 | Cameron | F28F 3/022 29/890.03 |
| 2016/0123230 A1 | 5/2016 | Thomas | |
| 2017/0167805 A1 | 6/2017 | Alvarez et al. | |
| 2018/0238630 A1* | 8/2018 | Pollard | F28F 3/025 |
| 2019/0086163 A1* | 3/2019 | Pollard | F28D 7/005 |

\* cited by examiner

METHOD FOR MANUFACTURING A CURVED HEAT EXCHANGER USING WEDGE SHAPED SEGMENTS

CROSS-REFERENCE TO RELATED APPLICATION(S)

This application is a continuation of U.S. application Ser. No. 16/712,731, filed Dec. 12, 2019, for "METHOD FOR MANUFACTURING A CURVED HEAT EXCHANGER USING WEDGE SHAPED SEGMENTS", by William T. Lockwood, Matthew William Miller, and Luke J. Mayo.

U.S. application Ser. No. 16/712,731 is a divisional of U.S. application Ser. No. 15/864,760, filed Jan. 8, 2018, for "METHOD FOR MANUFACTURING A CURVED HEAT EXCHANGER USING WEDGE SHAPED SEGMENTS", by William T. Lockwood, Matthew William Miller, and Luke J. Mayo.

STATEMENT OF GOVERNMENT INTEREST

This invention was made with government support under Contract No. FA8626-16-C-2139 awarded by the United States Air Force. The government has certain rights in the invention.

BACKGROUND

The present disclosure relates to heat exchangers, and in particular to curved plate-fin heat exchangers.

Heat exchangers are often used to transfer heat between two fluids. For example, in aircraft environmental control systems, heat exchangers may be used to transfer heat between a relatively hot air source (e.g., bleed air from a gas turbine engine) and a relatively cool air source (e.g., ram air). Some heat exchangers, often referred to as plate-fin heat exchangers, include a plate-fin core having multiple heat transfer sheets arranged in layers to define air passages there between. Closure bars seal alternating inlets of hot air and cool air inlet sides of the core. Accordingly, hot air and cool air are directed through alternating passages to form alternating layers of hot and cool air within the core. Heat is transferred between the hot and cool air via the heat transfer sheets that separate the layers. In addition, to facilitate heat transfer between the layers, each of the passages can include heat transfer fins, often formed of corrugated material (e.g., aluminum), that are oriented in a direction of the flow within the passage. The heat transfer fins increase turbulence and a surface area that is exposed to the airflow, thereby enhancing heat transfer between the layers.

Due to existing corrugated sheet structures and manufacturing techniques, known plate-fin heat exchangers have a rectangular axial cross section. In some applications, such as aircraft environmental control systems, the plate-fin heat exchangers are arranged around a central axis. As a result of the rectangular cross section of the plate-fin heat exchangers, gaps occur between adjacent plate-fin heat exchangers and between a curved housing and the plate-fin heat exchangers when the plate-fin heat exchangers are arranged circumferentially about the central axis. These gaps creates dead space next to the plate-fin heat exchangers that cannot be used by the plate-fin heat exchangers.

SUMMARY

In one embodiment, a heat exchanger includes a first section with a top side opposite a bottom side, wherein the top side is longer than the bottom side. The first section also includes a first side extending between the top side and the bottom side, and a second side extending between the top side and the bottom side opposite the first side. The first side and the second side of the first section taper toward each other as the first side and the second side extend toward the bottom side of the first section. The heat exchanger also includes a second section with a top side opposite a bottom side, and a first side extending between the top side of the second section and the bottom side of the second section. The second section also includes a second side extending between the top side of the second section and the bottom side of the second section opposite the first side of the second section. The second side of the second section of the heat exchanger is connected to the first side of the first section of the heat exchanger. A header manifold is connected to the first side of the second section.

In another embodiment, a heat exchanger includes a first section with a top opposite a bottom, a lengthwise dimension transverse to a widthwise dimension, and a first parting sheet at the top of the first section. The first section also includes a first lengthwise closure bar and a second lengthwise closure bar under the first parting sheet, with the first and second lengthwise closure bars extending in the lengthwise dimension and spaced from each other in the widthwise dimension. A second parting sheet is under the first and second lengthwise closure bars. The first parting sheet, the second parting sheet, the first lengthwise closure bar, and the second lengthwise closure bar together form a first lengthwise passage that extends in the lengthwise dimension through the first section of the heat exchanger. A first widthwise closure bar and a second widthwise closure bar are under the second parting sheet. The first and second widthwise closure bars extend in the widthwise dimension and are spaced from each other in the lengthwise dimension. A third parting sheet is under the first and second widthwise closure bars. The second parting sheet, the third parting sheet, the first widthwise closure bar, and the second widthwise closure bar together form a first widthwise passage that extends in the widthwise dimension through the first section of the heat exchanger. A third lengthwise closure bar and a fourth lengthwise closure bar are under the third parting sheet and extend in the lengthwise dimension and are spaced from each other in the widthwise dimension. A fourth parting sheet is under the third and fourth lengthwise closure bars. The third parting sheet, the fourth parting sheet, the third lengthwise closure bar, and the fourth lengthwise closure bar together form a second lengthwise passage that extends in the lengthwise dimension through the first section of the heat exchanger. The first and second lengthwise closure bars of the first section are both longer than the third and fourth lengthwise closure bars of the first section.

In another embodiment, a method for manufacturing a heat exchanger includes stacking a plurality of parting sheets, a plurality of lengthwise closure bars, and a plurality of widthwise closure bars to form a rectangular first heat exchanger section. The first heat exchanger section includes at least one widthwise passage extending between a pair of the widthwise closure bars and at least one lengthwise passage extending between a pair of the lengthwise closure bars. The method also includes brazing the rectangular first heat exchanger section together and cutting a first side and a second end of the rectangular first heat exchanger section to give the first heat exchanger section a tapered-trapezoid profile. The method further includes stacking a second plurality of parting sheets, a second plurality of lengthwise closure bars, and a second plurality of widthwise closure bars to form a second heat exchanger section. The second heat exchanger section includes at least one widthwise passage extending between a pair of the second plurality of widthwise closure bars and at least one lengthwise passage extending between a pair of the second plurality of lengthwise closure bars. The method further includes brazing the second heat exchanger section together, and brazing an end of the second heat exchanger section to the first or second end of the first heat exchanger section.

Persons of ordinary skill in the art will recognize that other aspects and embodiments are possible in view of the entirety of the present disclosure, including the accompanying figures.

Figure 1:
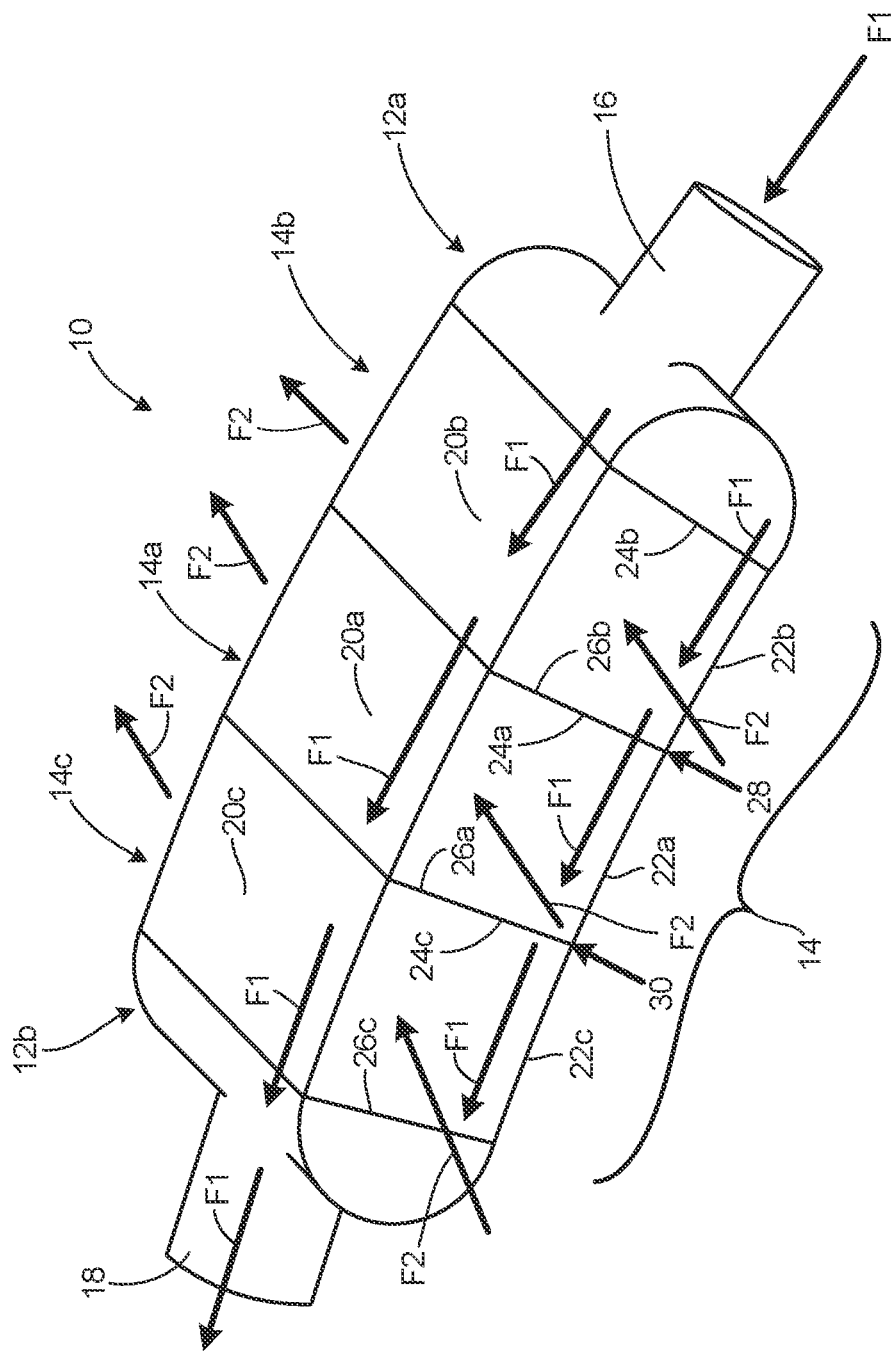
FIG. 1 is a perspective view of a heat exchanger.

While the above-identified drawing figures set forth one or more embodiments, other embodiments are also contemplated. It should be understood that numerous other modifications and embodiments can be devised by those skilled in the art, which fall within the scope and spirit of the principles of the claims. The figures may not be drawn to scale, and applications and embodiments may include features and components not specifically shown in the drawings. Like reference numerals identify similar structural elements.

DETAILED DESCRIPTION

The disclosure relates to a heat exchanger with multiple core sections. At least one of the core sections of the heat exchanger is wedge-shaped (i.e., tapered on two sides). When the wedge-shaped core section(s) is connected to adjacent core sections in the heat exchanger, the interface between the tapered sides of the wedge-shaped core section(s) and the adjacent core sections creates a bend (or bends) in the overall geometry of the heat exchanger. The bend(s) in the heat exchanger allow the heat exchanger to curve and better fill and utilize non-rectangular spaces. The disclosure also relates to a method for manufacturing this heat exchanger. The bent heat exchanger is described below with reference to FIGS. 1-4.

FIG. 1 is a perspective view of heat exchanger 10. As shown in FIG. 1, heat exchanger 10 includes first header 12a, second header 12b, and core 14 with first section 14a, second section 14b, and third section 14c. First header 12a includes inlet 16 and second header 12b includes outlet 18. First section 14a of core 14 includes top side 20a, bottom side 22a, first side 24a, and second side 26a. Second section 14b of core 14 includes top side 20b, bottom side 22b, first side 24b, and second side 26b. Third section 14c of core 14 includes top side 20c, bottom side 22c, first side 24c, and second side 26c. Heat exchanger 10 also includes first bend 28 and second bend 30. Hot air F1 and cool air F2 interact with heat exchanger 10.

Top side 20a of first section 14a is positioned opposite bottom side 22a. First side 24a of first section 14a is positioned opposite second side 26a, and both first side 24a and second side 26a of first section 14a extend from top side 20a to bottom side 22a. Top side 20a is longer than bottom side 22a, causing first side 24a and second side 26a to taper toward each other as they extend to bottom side 22a. In the embodiment of FIG. 1, second section 14b of core 14 is identical to first section 14a, except that first side 24b of second section 14b is not tapered. Top side 20b of second section 14b is positioned opposite bottom side 22b. First side 24b of second section 14b is positioned opposite second side 26b, and both first side 24b and second side 26b of second section 14b extend from top side 20b to bottom side 22b. Top side 20b is longer than bottom side 22b, second side 26b to taper as second side 26b extends to bottom side 22b. In the embodiment of FIG. 1, third section 14c of core 14 is also identical to first section 14a, except that second side 26c of third section 14c is not tapered. Top side 20c of third section 14c is positioned opposite bottom side 22c. First side 24c of third section 14c is positioned opposite second side 26c, and both first side 24c and second side 26c of third section 14c extend from top side 20c to bottom side 22c. Top side 20c is longer than bottom side 22c, causing first side 24c to taper as first side 24c extends to bottom side 22c.

Third section 14c, first section 14a, and second section 14b of core 14 are connected in series between first header 12a and second header 12b. As shown in FIG. 1, first header 12a is connected to first side 24b of second section 14b. Second side 26b of second section 14b is connected to first side 24a of first section 14a. Second side 26a of first section 14a is connected to first side 24c of third section 14c. Second side 26c of third section 14c is connected to second header 12b. First section 14a, second section 14b, and third section 14c of core 14 are brazed together to form core 14. First header 12a and second header 12b are welded to core 14 to form heat exchanger 10. Because first section 14a is tapered and portions of second section 14b and third section 14c are tapered, first bend 28 occurs in heat exchanger 10 between first section 14a and second section 14b of core 14, and second bend 30 occurs between first section 14a and third section 14c of core 14. First bend 28 and second bend 30 in heat exchanger 10 cause heat exchanger 10 to arc and curve from first header 12a to second header 12b. Because heat exchanger 10 arcs and curves from first header 12a to second header 12b, heat exchanger 10 can be used in curved spaces, such as curved or annular ducts in aircraft environmental control systems.

During operation of heat exchanger 10, hot air F1 enters inlet 16 on first header 12a where first header 12a directs hot air F1 in second section 14b of core 14. As discussed below with respect to FIGS. 2A and 2B, heat exchanger 10 is a plate-fin heat exchanger with lengthwise passages that extend completely through second section 14b, first section 14a, and third section 14c so that hot air F1 is able to flow from first header 12a, through core 14, and into second header 12b. After entering second header 12b, hot air F1 exits heat exchanger 10 through outlet 18 of second header 12b. As also discussed below with reference to FIGS. 2A and 2B, first section 14a, second section 14b, and third section 14c of core 14 each include widthwise passages that allow cool air F2 to flow orthogonally through core 14 without mixing with hot air F1.

Figure 2A:
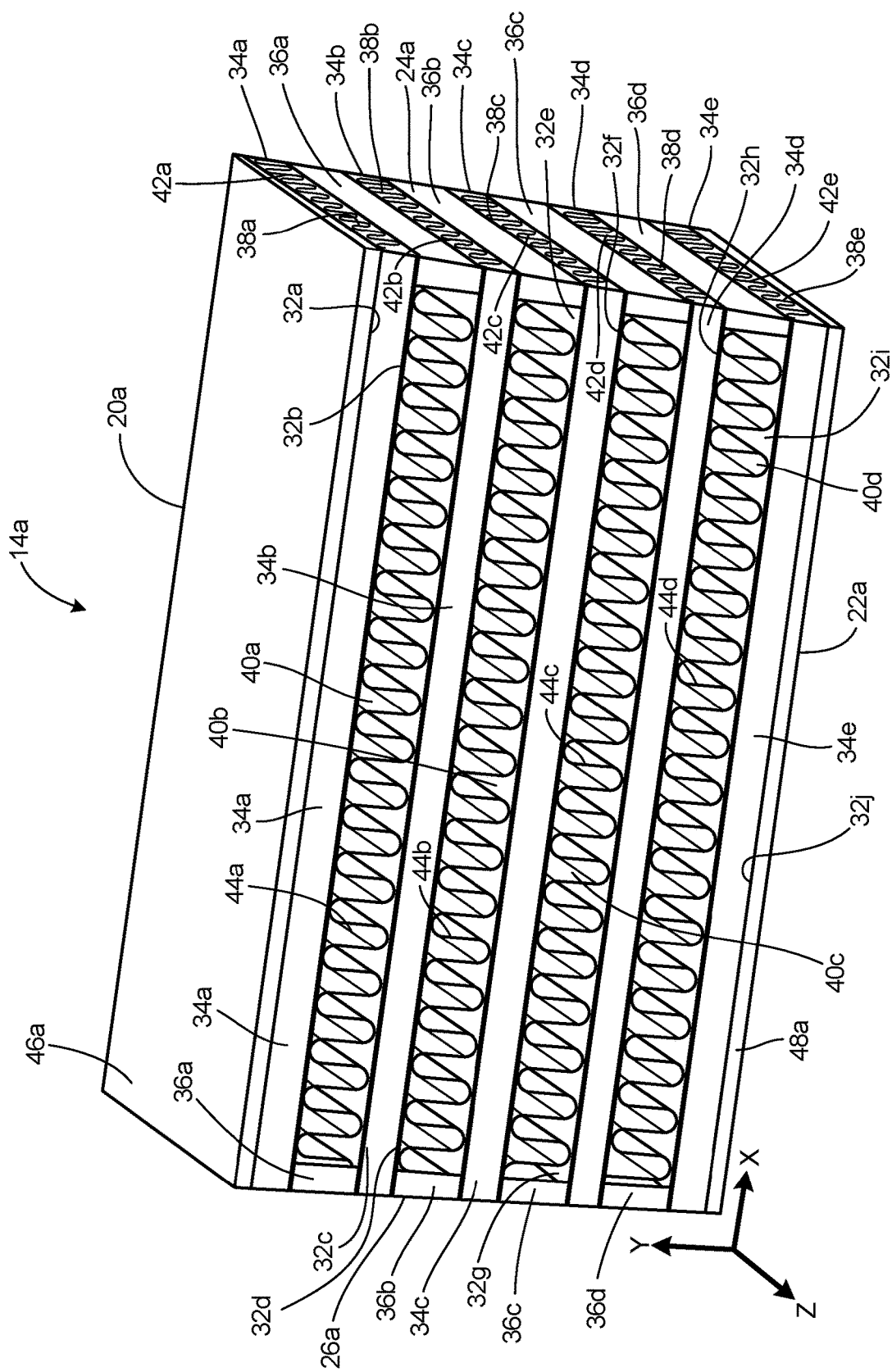
FIG. 2A is a perspective view of a section of the heat exchanger.
Figure 2B:
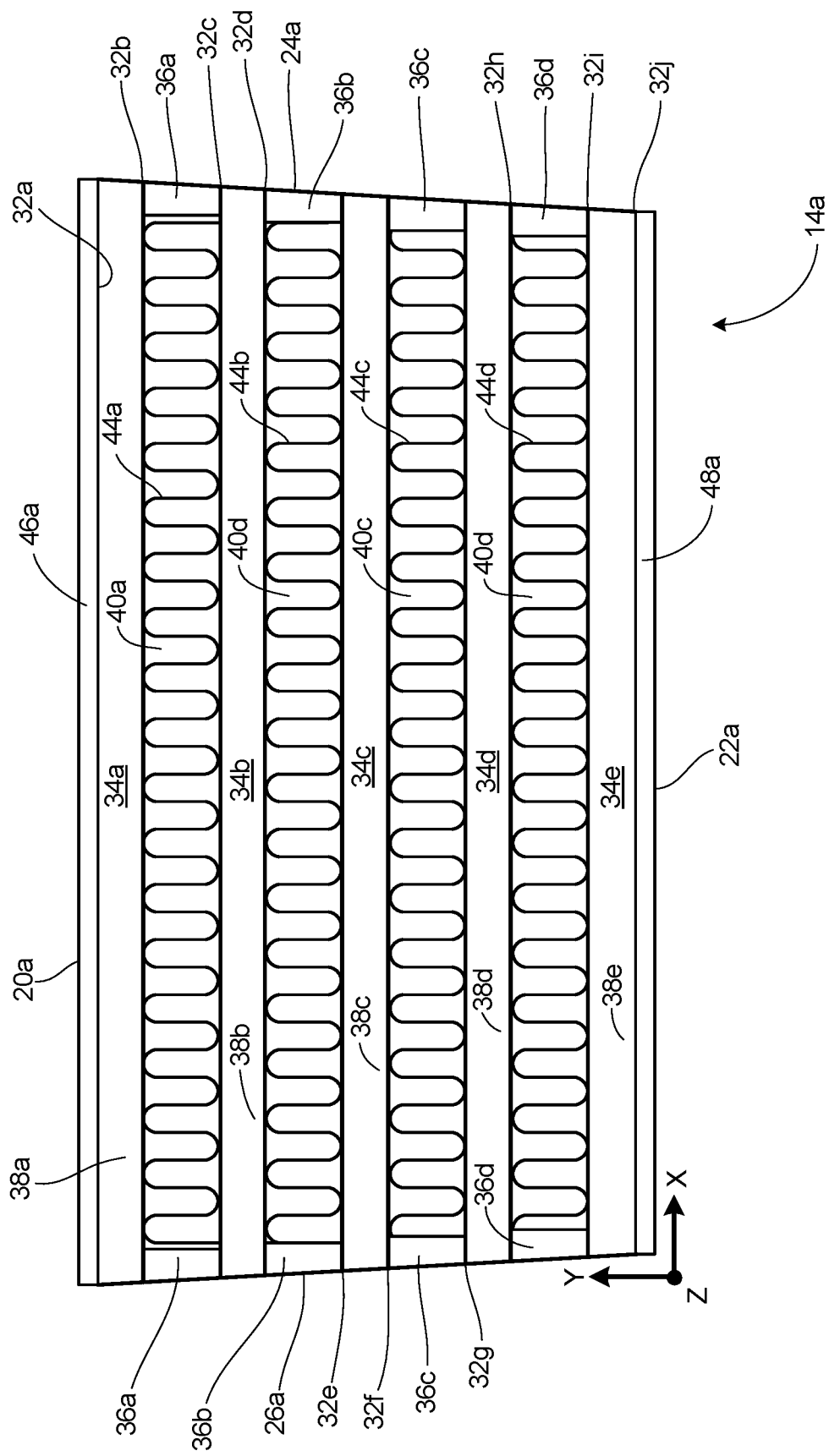
FIG. 2B is a side elevation view of the section of the heat exchanger from FIG. 2A.

FIG. 2A is a perspective view of first section 14a of core 14 of heat exchanger 10. FIG. 2B is a side elevation view of first section 14a of core 14 of heat exchanger 10 from FIG. 2A. While FIGS. 2A and 2B illustrate first section 14a of core 14, the following discussion of FIGS. 2A and 2B can be adapted and applied to second section 14b and third section 14c of core 14. As shown in FIGS. 2A and 2B, first section 14a further includes parting sheets 32a-32j, lengthwise closure bars 34a-34e, widthwise closure bars 36a-36d, hot-gas passages 38a-38e, cool-gas passages 40a-40d, lengthwise corrugated sheets 42a-42e, widthwise corrugated sheets 44a-44d, top end sheet 46a, and bottom end sheet 48a.

In FIGS. 2A and 2B, a lengthwise dimension X of first section 14a is defined as the direction parallel to the x-axis, a widthwise dimension Z of first section 14a is defined as the direction parallel to the z-axis, and a height dimension Y of first section 14a is defined as the direction parallel to the y-axis. To form first section 14a, the elements of first section 14a are stacked in the height dimension Y in the following order, descending from top side 20a to bottom side 22a of first section 14a: top end sheet 46a, parting sheet 32a, lengthwise closure bars 34a (two shown), lengthwise corrugation 42a, parting sheet 32b, widthwise closure bars 36a (two shown), widthwise corrugation 44a, parting sheet 32c, lengthwise closure bars 34b (two shown), lengthwise corrugation 42b, parting sheet 32d, widthwise closure bars 36b (two shown), widthwise corrugation 44b, parting sheet 32e, lengthwise closure bars 34c (two shown), lengthwise corrugation 42c, parting sheet 32f, widthwise closure bars 36c (two shown), widthwise corrugation 44c, parting sheet 32g, lengthwise closure bars 34d (two shown), lengthwise corrugation 42d, parting sheet 32h, widthwise closure bars 36d (two shown), widthwise corrugation 44d, parting sheet 32i, lengthwise closure bars 34e (two shown), lengthwise corrugation 42e, parting sheet 32j, and bottom end sheet 48a.

All of lengthwise closure bars 34a-34e shown in FIGS. 2A and 2B extend in the lengthwise dimension X and each pair of lengthwise closure bars 34a-34e are spaced apart in the widthwise dimension Z. Hot-gas passages 38a-38e are passages that extend in the lengthwise dimension X through first section 14a. Hot-gas passages 38a-38e are formed by lengthwise closure bars 34a-34e and parting sheets 32a-32j. For example, parting sheet 32a, parting sheet 32b, lengthwise corrugation 42a, and lengthwise closure bars 34a form hot-gas passage 38a. Parting sheet 32c, parting sheet 32d, lengthwise corrugation 42b, and lengthwise closure bars 34b form hot-gas passage 38b. Parting sheet 32e, parting sheet 32f, lengthwise corrugation 42c, and lengthwise closure bars 34c form hot-gas passage 38c. Parting sheet 32g, parting sheet 32h, lengthwise corrugation 42d, and lengthwise closure bars 34d form hot-gas passage 38d. Parting sheet 32i, parting sheet 32j, lengthwise corrugation 42e, and lengthwise closure bars 34e form hot-gas passage 38e.

All of widthwise closure bars 36a-36d shown in FIGS. 2A and 2B extend in the widthwise dimension Z and each pair of widthwise closure bars 36a-36d are spaced apart in the lengthwise dimension X. Cool-gas passages 40a-40d are passages that extend in the widthwise dimension Z through first section 14a. Cool-gas passages 40a-40d are formed by widthwise closure bars 36a-36d and parting sheets 32b-32i. For example, parting sheet 32b, parting sheet 32c, widthwise corrugation 44a, and widthwise closure bars 36a form cool-gas passage 40a. Parting sheet 32d, parting sheet 32e, widthwise corrugation 44b, and widthwise closure bars 36b form cool-gas passage 40b. Parting sheet 32f, parting sheet 32g, widthwise corrugation 44c, and widthwise closure bars 36c form cool-gas passage 40c. Parting sheet 32h, parting sheet 32i, widthwise corrugation 44d, and widthwise closure bars 36d form cool-gas passage 40d.

The configuration of first section 14a in FIGS. 2A and 2B alternates hot-gas passages 38a-38e with cool-gas passages 40a-40d along the height dimension Y such that each one of cool-gas passages 40a-40d is positioned vertically on first section 14a between two of hot-gas passages 38a-38e. Alternating hot-gas passages 38a-38e with cool-gas passages 40a-40d improves the efficiency of first section 14a of heat exchanger 10 by increasing the heat transfer area between hot air F1 and cool air F2. To further increase the heat transfer area inside first section 14a, lengthwise corrugated sheets 42a-42e are positioned inside hot-gas passages 38a-38e respectively, and widthwise corrugated sheets 44a-44d are positioned inside cool-gas passages 40a-40d respectively. Lengthwise corrugated sheets 42a-42e extend the entire length of hot-gas passages 38a-38e respectively, and widthwise corrugated sheets 44a-44d extend the entire length of cool-gas passages 40a-40d respectively.

As previously discussed above with reference to FIG. 1, first section 14a of core 14 is tapered with top side 20a longer than bottom side 22a, and first side 24a and second side 26a tapering toward each other as they extend to bottom side 22a of first section 14a. FIG. 2B best illustrates the tapered profile of first section 14a. As shown in FIG. 2B, lengthwise closure bars 34a-34e decrease in length in the X dimension from top side 20a to bottom side 22a. For example, the two lengthwise closure bars 34a are longer in the X dimension than the two lengthwise closure bars 34b. Lengthwise closure bars 34e have the shortest length among lengthwise closure bars 34a-34e. Parting sheets 32a-32j also decrease in length in the X dimension from top side 20a to bottom side 22a. For example, parting sheet 32a is longer than parting sheet 32b in the X dimension, and parting sheet 32b is longer than parting sheet 32c in the X dimension. Parting sheet 32j has the shortest length of parting sheets 32a-32j in the X dimension.

As part of forming tapered first side 24a and second side 26a of first section 14a, each of widthwise closure bars 36a-36d includes a ramping trapezoid cross-section on the X-Y plane with two ninety-degree angles, one obtuse angle, and one acute angle. Each of lengthwise closure bars 34a-34e include a rectangular cross-section on the Y-Z plane and an elongated isosceles trapezoid profile on the X-Y plane. Overall, first section 14a of core 14 (shown in FIG. 1) has a tapered-trapezoid profile on the X-Y plane with the length of first section 14a in the X dimension decreasing from top end sheet 46 down to bottom end sheet 48. A method for manufacturing first section 14a (as well as second section 14b and third section 14c) and heat exchanger 10 is described below with reference to FIGS. 3A-4.

Figure 3A:
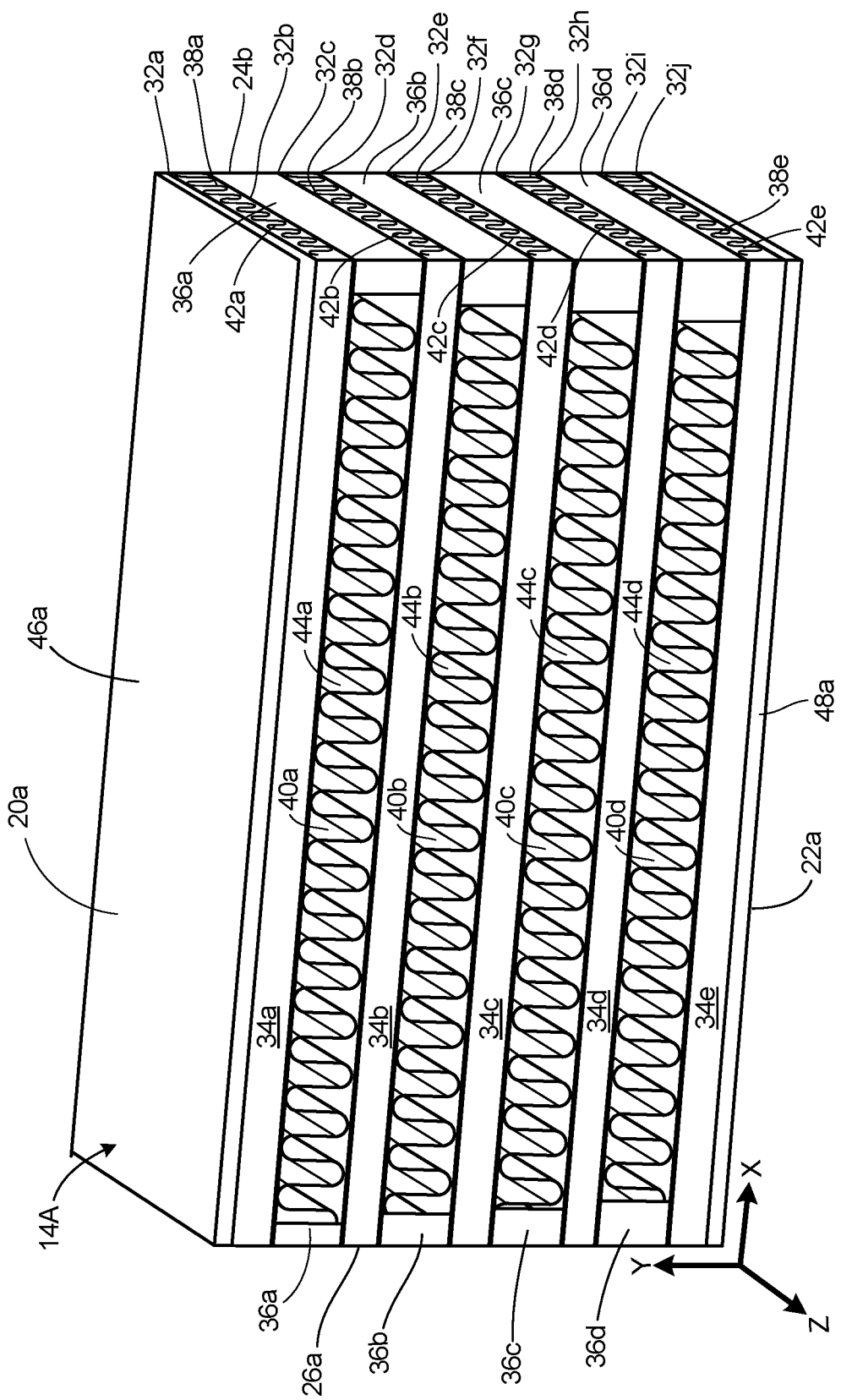
FIG. 3A is a perspective view of a section of the heat exchanger prior to a cutting step.
Figure 3B:
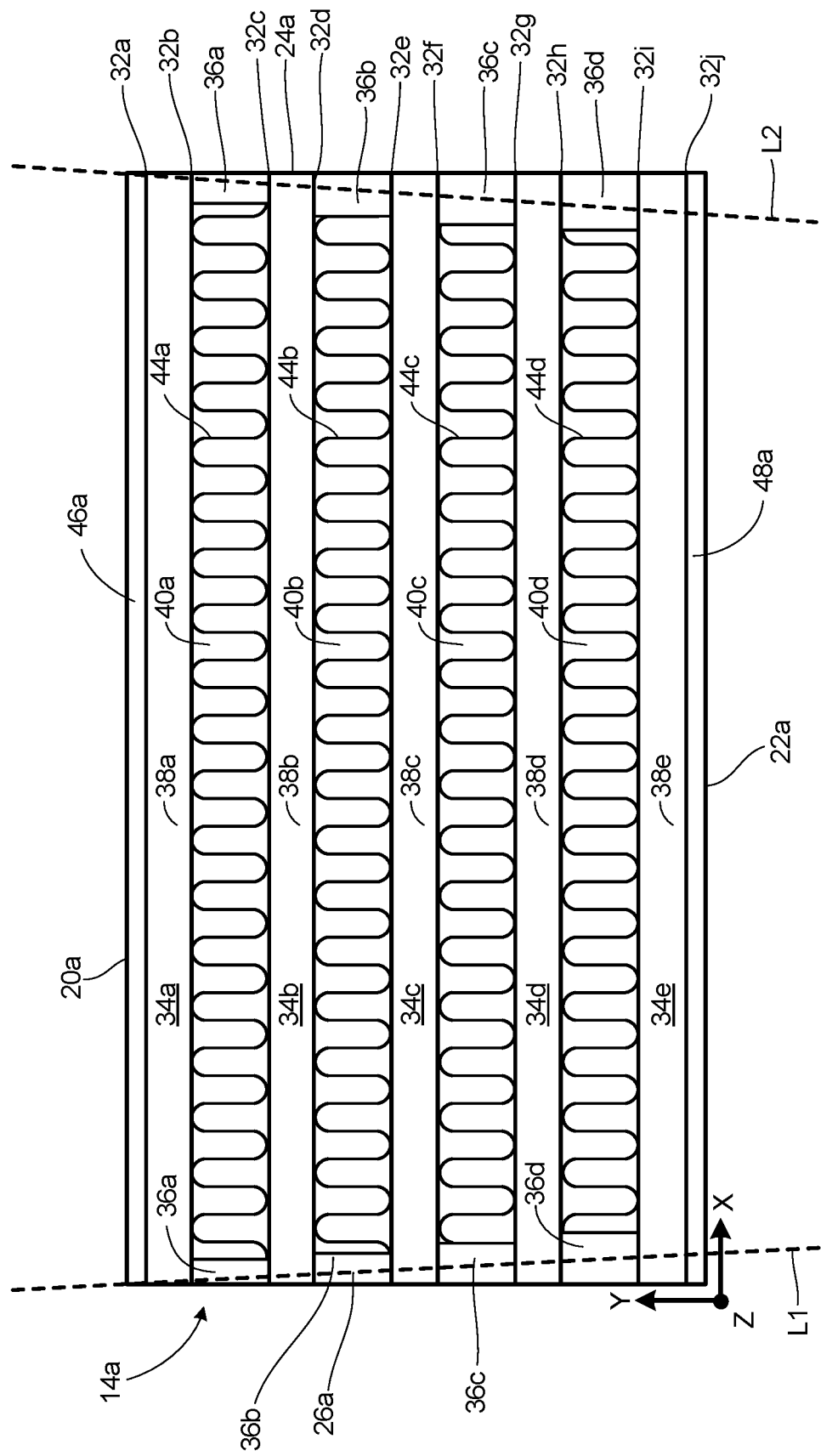
FIG. 3B is a side elevation view of the section of the heat exchanger from FIG. 3A.
Figure 4:
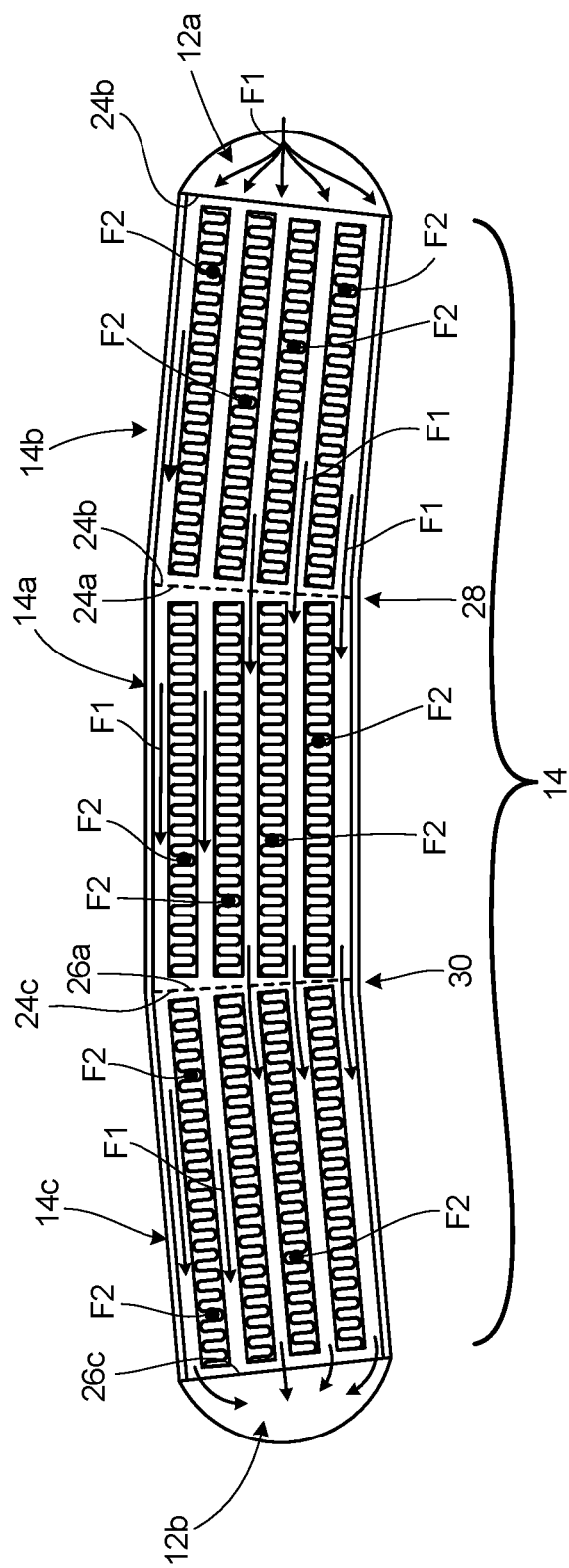
FIG. 4 is a side elevation view of the heat exchanger.

FIG. 3A is a perspective view of a prefinished embodiment of first section 14a of core 14 (shown in FIG. 1) for heat exchanger 10 (also shown in FIG. 1). FIG. 3B is a side elevation view of the prefinished embodiment of first section 14a from FIG. 3A. FIG. 4 is a side elevation view of a completed embodiment of heat exchanger 10. While FIGS. 3A and 3B illustrate first section 14a, the following discussion of FIGS. 3A and 3B can also be applied to second section 14b and third section 14c of core 14.

To manufacture first section 14a, the elements of first section 14a are stacked in the height dimension Y in the following order, descending from top side 20a to bottom side 22a of first section 14a: top end sheet 46a, parting sheet 32a, lengthwise closure bars 34a, parting sheet 32b, widthwise closure bars 36a, parting sheet 32c, lengthwise closure bars 34b, parting sheet 32d, widthwise closure bars 36b, parting sheet 32e, lengthwise closure bars 34c, parting sheet 32f, widthwise closure bars 36c, parting sheet 32g, lengthwise closure bars 34d, parting sheet 32h, widthwise closure bars 36d, parting sheet 32i, lengthwise closure bars 34e, parting sheet 32j, and bottom end sheet 48a. lengthwise corrugated sheets 42a-42e are inserted inside hot-gas passages 38a-38e respectively, and widthwise corrugated sheets 44a-44d are inserted inside cool-gas passages 40a-40d respectively.

As shown best in FIG. 3B, all of lengthwise closure bars 34a-34e originally have the same length in the X dimension. Widthwise closure bars 36a-36d have differing thicknesses in the X dimension, with the thickness of widthwise closure bars 36a-36d increasing from widthwise closure bars 36a down to widthwise closure bars 36d. For example widthwise closure bars 36a are each thinner in the X dimension than widthwise closure bars 36b, and widthwise closure bars 36b are thinner in the X dimension than widthwise closure bars 36c. Widthwise closure bars 36d are the thickest of widthwise closure bars 36a-36d.

After stacking parting sheets 32a-32j, lengthwise closure bars 34a-34e, widthwise closure bars 36a-36d, lengthwise corrugated sheets 42a-42e, widthwise corrugated sheets 44a-44d, top end sheet 46a, and bottom end sheet 48a as described above, the above listed elements are brazed together into a rectangular prefinished first section 14a using a first braze material at a first temperature. After the elements of prefinished first section 14 are brazed together, the ends of prefinished first section 14 are cut along lines L1 and L2 to form tapered first side 24a and tapered second side 26a and give first section 14a a tapered-trapezoid profile. The cuts along lines L1 and L2 are accommodated by the increasing thicknesses of widthwise closure bars 36a-36d. The cuts along lines L1 and L2 can be performed through wire-cut electrical discharge machining (EDM). After cutting first section 14 along lines L1 and L2, the above steps used to produce tapered first section 14a of core section 14 are repeated to produce second section 14b (shown above in FIG. 1 and below in FIG. 4) and to produce third section 14c (shown above in FIG. 1 and below in FIG. 4). Because first side 24b of second section 14b and second side 26c of third section 14c are both not tapered (as discussed previously with reference to FIG. 1), second section 14b and third section 14c each only require one angled cut.

After manufacturing first section 14a, second section 14b, and third section 14c, the three sections 14a, 14b, and 14c are positioned relative one another such that hot-gas passages 38a-38e of first section 14a are contiguous with hot-gas passages 38a-38e of second section 14b and third section 14c respectively, as shown in FIG. 4. First section 14a, second section 14b, and third section 14c are then brazed together to form core 14 using a second braze material at a second temperature. The second braze material has a lower melting temperature than the first braze material, and thus the second temperature is lower than the first temperature. Because first section 14a, second section 14b, and third section 14c are brazed at a lower temperature than the first brazing temperature used to produce sections 14a, 14b, and 14c, first section 14a, second section 14b, and/or third section 14c are not at risk of individually falling apart during the second braze. First header 12a and second header 12b are then positioned relative core 14 and welded to core 14.

As shown in FIG. 4, first header manifold 12a is welded to first side 24b of second section 14b. Second side 26b of second section 14b is connected by the second braze material to first side 24a of first section 14b. Second side 26a of first section 14a is connected by the second braze material to first side 24c of third section 14c. Second side 26c of third section 14c is welded to second header 12b. Because of the tapered sides of first section 14a, second section 14b, and third section 14c, first bend 28 and second bend 30 are formed in core 14 of heat exchanger 10. First bend 28 and second bend 30 in heat exchanger 10 cause heat exchanger 10 to arc and curve from first header 12a to second header 12b. Because heat exchanger 10 arcs and curves from first header 12a to second header 12b, heat exchanger 10 can be used in curved spaces, such as curved or annular ducts in aircraft environmental control systems.

The following are non-exclusive descriptions of possible embodiments of the present invention.

In one embodiment, a heat exchanger includes a first section with a top side opposite a bottom side, wherein the top side is longer than the bottom side. The first section also includes a first side extending between the top side and the bottom side, and a second side extending between the top side and the bottom side opposite the first side. The first side and the second side of the first section taper toward each other as the first side and the second side extend toward the bottom side of the first section. The heat exchanger also includes a second section with a top side opposite a bottom side, and a first side extending between the top side of the second section and the bottom side of the second section. The second section also includes a second side extending between the top side of the second section and the bottom side of the second section opposite the first side of the second section. The second side of the second section of the heat exchanger is connected to the first side of the first section of the heat exchanger. A header manifold is connected to the first side of the second section.

The heat exchanger of the preceding paragraph can optionally include, additionally and/or alternatively, any one or more of the following features, configurations and/or additional components:

the top side of the second section is longer than the bottom side of the second section, and the first side of the second section and/or the second side of the second section taper from the top side of the second section to the bottom side of the second section;

a first hot-gas passage extending from the first side of the first section to the second side of the first section; and a second hot-gas passage extending from the first side of the second section to the second side of the second section, wherein the second hot-gas passage of the second section is contiguous with the first hot-gas passage of the first section; and/or a first corrugated sheet inside the first hot-gas passage of the first section and extending from the first side of the first section to the second side of the first section; and a second corrugated sheet inside the second hot-gas passage of the second section and extending from the first side of the second section to the second side of the second section.

In another embodiment, a heat exchanger includes a first section with a top opposite a bottom, a lengthwise dimension transverse to a widthwise dimension, and a first parting sheet at the top of the first section. The first section also includes a first lengthwise closure bar and a second lengthwise closure bar under the first parting sheet, with the first and second lengthwise closure bars extending in the lengthwise dimension and spaced from each other in the widthwise dimension. A second parting sheet is under the first and second lengthwise closure bars. The first parting sheet, the second parting sheet, the first lengthwise closure bar, and the second lengthwise closure bar together form a first lengthwise passage that extends in the lengthwise dimension through the first section of the heat exchanger. A first widthwise closure bar and a second widthwise closure bar are under the second parting sheet. The first and second widthwise closure bars extend in the widthwise dimension and are spaced from each other in the lengthwise dimension. A third parting sheet is under the first and second widthwise closure bars. The second parting sheet, the third parting sheet, the first widthwise closure bar, and the second widthwise closure bar together form a first widthwise passage that extends in the widthwise dimension through the first section of the heat exchanger. A third lengthwise closure bar and a fourth lengthwise closure bar are under the third parting sheet and extend in the lengthwise dimension and are spaced from each other in the widthwise dimension. A fourth parting sheet is under the third and fourth lengthwise closure bars. The third parting sheet, the fourth parting sheet, the third lengthwise closure bar, and the fourth lengthwise closure bar together form a second lengthwise passage that extends in the lengthwise dimension through the first section of the heat exchanger. The first and second lengthwise closure bars of the first section are both longer than the third and fourth lengthwise closure bars of the first section.

The heat exchanger of the preceding paragraph can optionally include, additionally and/or alternatively, any one or more of the following features, configurations and/or additional components:

the length of the first section tapers from the first parting sheet to the fourth parting sheet;

the first section further comprises: a third widthwise closure bar and a fourth widthwise closure bar under the fourth parting sheet, wherein the third and fourth widthwise closure bars extend in the widthwise dimension and are spaced from each other in the lengthwise dimension; and a fifth parting sheet under the third and fourth widthwise closure bars, wherein the fourth parting sheet, the fifth parting sheet, the third widthwise closure bar, and the fourth widthwise closure bar together form a second widthwise passage that extends in the widthwise dimension through the first section of the heat exchanger;

a second section comprising: a top, a bottom, a lengthwise dimension, a widthwise dimension, a first parting sheet, a second parting sheet, a third parting sheet, a fourth parting sheet, a first lengthwise closure bar, a second lengthwise closure bar, a third lengthwise closure bar, a fourth lengthwise closure bar, a first widthwise closure bar, a second widthwise closure bar, a first lengthwise passage, a second lengthwise passage, and a first widthwise passage all arranged in the same manner as the first section of the heat exchanger, wherein the first widthwise closure bar of the second section of the heat exchanger is connected to the second widthwise closure bar of the first section of the heat exchanger, wherein the first lengthwise passage of the second section of the heat exchanger is contiguous with the first lengthwise passage of the first section of the heat exchanger, and wherein the second lengthwise passage of the second section of the heat exchanger is contiguous with the second lengthwise passage of the first section of the heat exchanger;

the first parting sheet of the first section is longer than the second parting sheet of the first section, wherein the second parting sheet of the first section is longer than the third parting sheet of the first section, wherein the third parting sheet of the first section is longer than the fourth parting sheet of the first section;

a first corrugated sheet inside the first lengthwise passage of the first section of the heat exchanger; a second corrugated sheet inside the second lengthwise passage of the first section of the heat exchanger; a third corrugated sheet inside the first widthwise passage of the first section of the heat exchanger; a fourth corrugated sheet inside the first lengthwise passage of the second section of the heat exchanger; a fifth corrugated sheet inside the second lengthwise passage of the second section of the heat exchanger; and a sixth corrugated sheet inside the first widthwise passage of the second section of the heat exchanger;

a first braze material connects together at least the following parts of the first section: the first parting sheet, the second parting sheet, the third parting sheet, the fourth parting sheet, the first lengthwise closure bar, the second lengthwise closure bar, the third lengthwise closure bar, the fourth lengthwise closure bar, the first widthwise closure bar, and the second widthwise closure bar;

a second braze material connects the first section of the heat exchanger to the second section of the heat exchanger, wherein the second braze material has a lower melting temperature than the first braze material; and/or a header manifold is welded to the second widthwise closure bar of the second section or the first widthwise closure bar of the first section.

In another embodiment, a method for manufacturing a heat exchanger includes stacking a plurality of parting sheets, a plurality of lengthwise closure bars, and a plurality of widthwise closure bars to form a rectangular first heat exchanger section. The first heat exchanger section includes at least one widthwise passage extending between a pair of the widthwise closure bars and at least one lengthwise passage extending between a pair of the lengthwise closure bars. The method also includes brazing the rectangular first heat exchanger section together and cutting a first side and a second side of the rectangular first heat exchanger section to give the first heat exchanger section a tapered-trapezoid profile. The method further includes stacking a second plurality of parting sheets, a second plurality of lengthwise closure bars, and a second plurality of widthwise closure bars to form a second heat exchanger section. The second heat exchanger section includes at least one widthwise passage extending between a pair of the second plurality of widthwise closure bars and at least one lengthwise passage extending between a pair of the second plurality of lengthwise closure bars. The method further includes brazing the second heat exchanger section together, and brazing an end of the second heat exchanger section to the first or second side of the first heat exchanger section.

The method of the preceding paragraph can optionally include, additionally and/or alternatively, any one or more of the following features, configurations and/or additional components:

brazing the rectangular first heat exchanger section together at a first temperature; brazing the second heat exchanger section together at the first temperature; and brazing the end of the second heat exchanger section to the first or second side of the first heat exchanger section at a second temperature, wherein the second temperature is lower than the first temperature;

the plurality of widthwise closure bars of the first heat exchanger section prior to cutting comprises a first pair of widthwise closure bars and a second pair of widthwise closure bars, wherein the widthwise closure bars in the first pair are each thicker than the widthwise closure bars in the second pair;

brazing the end of the second heat exchanger section to the first side of the first heat exchanger section; and welding a header manifold to the second heat exchanger section opposite the first heat exchanger section;

brazing the second heat exchanger section together; cutting a first side and/or a second side of the second heat exchanger section to taper the first side and/or second side of the second heat exchanger section; brazing the second side of the second heat exchanger section to the first side of the first heat exchanger section;
brazing the second heat exchanger section to the first heat exchanger section forms a bend in the heat exchanger; and/or
stacking a third plurality of parting sheets, a third plurality of lengthwise closure bars, and a third plurality of widthwise closure bars to form a third heat exchanger section with at least one widthwise passage extending between a pair of the third plurality of widthwise closure bars and at least one lengthwise passage extending between a pair of the third plurality of lengthwise closure bars; cutting a first side and/or a second side of the third heat exchanger section to taper the first side and/or second side of the third heat exchanger section; and brazing the first side of the third heat exchanger section to the second side of the first heat exchanger section, wherein brazing the third heat exchanger section to the first heat exchanger section forms a second bend in the heat exchanger.

Any relative terms or terms of degree used herein, such as "substantially", "essentially", "generally", "approximately", and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transitory vibrations and sway movements, temporary alignment or shape variations induced by operational conditions, and the like.

While the invention has been described with reference to an exemplary embodiment(s), it will be understood by those skilled in the art that various changes may be made and equivalents may be substituted for elements thereof without departing from the scope of the invention. For example, while the above disclosure describes core 14 as having three sections 14a, 14b, and 14c, core 14 of heat exchanger 10 can have more than three sections. In addition, many modifications may be made to adapt a particular situation or material to the teachings of the invention without departing from the essential scope thereof. For example, while the above disclosure describes first section 14a, second section 14b, and third section 14c as being the same as one another, core 14 can include non-identical sections. Therefore, it is intended that the invention not be limited to the particular embodiment(s) disclosed, but that the invention will include all embodiments falling within the scope of the appended claims.

The invention claimed is:

1. A method for manufacturing a heat exchanger comprising:
forming a first heat exchanger section with a tapered-trapezoid profile and a first side opposite a second side, wherein forming the first heat exchanger section comprises:
stacking a plurality of parting sheets, a plurality of lengthwise closure bars, and a plurality of widthwise closure bars to form a rectangular heat exchanger section with at least one widthwise passage extending between the widthwise closure bars and at least one lengthwise passage extending between the lengthwise closure bars;
brazing the rectangular heat exchanger section together; and
cutting a first side and a second side of the rectangular heat exchanger section to give the first heat exchanger section the tapered-trapezoid profile, and wherein the plurality of widthwise closure bars of the first heat exchanger section prior to cutting comprises a first pair of widthwise closure bars and a second pair of widthwise closure bars, wherein the widthwise closure bars in the first pair are each thicker than the widthwise closure bars in the second pair;
forming a second heat exchanger section, wherein forming the second heat exchanger section comprises:
stacking a second plurality of parting sheets, a second plurality of lengthwise closure bars, and a second plurality of widthwise closure bars to form the second heat exchanger section with at least one widthwise passage of the second heat exchanger section extending between a pair of the second plurality of widthwise closure bars and at least one lengthwise passage of the second heat exchanger section extending between a pair of the second plurality of lengthwise closure bars; and
brazing the second heat exchanger section together; and
brazing an end of the second heat exchanger section to the first or second side of the first heat exchanger section.

2. The method of claim 1 further comprising:
brazing the rectangular heat exchanger section together at a first temperature;
brazing the second heat exchanger section together at the first temperature; and
brazing the end of the second heat exchanger section to the first or second side of the first heat exchanger section at a second temperature, wherein the second temperature is lower than the first temperature.

3. The method of claim 1 further comprising:
welding a header manifold to the second heat exchanger section opposite the first heat exchanger section.

4. The method of claim 1 further comprising:
brazing the second heat exchanger section together;
cutting a first side and/or a second side of the second heat exchanger section to taper the first side and/or second side of the second heat exchanger section;
brazing the second side of the second heat exchanger section to the first side of the first heat exchanger section.

5. The method of claim 4, wherein brazing the second heat exchanger section to the first heat exchanger section forms a bend in the heat exchanger.

6. The method of claim 5 further comprising:
stacking a third plurality of parting sheets, a third plurality of lengthwise closure bars, and a third plurality of widthwise closure bars to form a third heat exchanger section with at least one widthwise passage extending between a pair of the third plurality of widthwise closure bars and at least one lengthwise passage extending between a pair of the third plurality of lengthwise closure bars;
cutting a first side and/or a second side of the third heat exchanger section to taper the first side and/or second side of the third heat exchanger section; and
brazing the first side of the third heat exchanger section to the second side of the first heat exchanger section,
wherein brazing the third heat exchanger section to the first heat exchanger section forms a second bend in the heat exchanger.

* * * * *